Jan. 1, 1963        W. L. HINKS        3,071,422

CONTINUOUS STRIP TYPE OF STATIC LOAD BEARING

Filed Aug. 10, 1959

INVENTOR
WILLIAM L. HINKS

BY *Larellian Freeman*

ATTORNEY

United States Patent Office 3,071,422
Patented Jan. 1, 1963

3,071,422
CONTINUOUS STRIP TYPE OF STATIC
LOAD BEARING
William L. Hinks, 1079 Washington Blvd.,
Cuyahoga Falls, Ohio
Filed Aug. 10, 1959, Ser. No. 832,552
8 Claims. (Cl. 308—237)

This invention relates to the art of laminated bearings and in particular has reference to an improvement in a laminated bearing that is made up of a plurality of alternate layers of metal and elastomer and which is designed to withstand forces applied normal to the layers while yielding to forces applied through a plane that is coplanar with the layers.

In applicant's copending application, Serial No. 504,324, filed April 24, 1955, and now U.S. Patent 2,900,182, there was disclosed a laminated bearing having the above properties.

More specifically, the above referred to copending application disclosed the concept of employing alternate layers of metal and elastomer to form a laminated bearing. The layers of the bearing were relatively thin, with the thickness of the elastomer layer being such that the same was substantially incompressible to force applied normally thereagainst. The elastomer layer, however, while being incompressible, would yield to shear forces that occur, for example, during the application of torsion load to the bearing.

While the above type of bearing has been satisfactory in all respects, it has been found that the manufacture thereof can be simplified if the bearing is made from one or more continuous metallic strips, preferably coated with rubber on one or more sides and being wound around an axis of rotation so as to form a helical type of bearing wherein the metal layers are continuously separated by elastomer layers.

In this fashion, the same desired properties as are obtained in the above referred to copending application are obtained by the use of the single strip, with the single strip type of improvement obviously facilitating the manufacture of the bearing.

In practice, it has been found that the elastomer can be painted or otherwise deposited on the faces of the metallic ribbon, with the usual control means being employed to obtain the required thickness of deposit on each layer.

Production of an improved continuous strip type of laminated bearing having the above described improved properties accordingly becomes the principal object of this invention, with other objects becoming more apparent upon a reading of the following brief specification, considered and interpreted in the light of the accompanying drawings.

Figure 6:
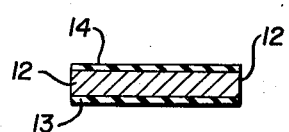
FIGURE 6 is a sectional view taken on the lines 6—6 of FIGURE 2.
Figure 5:
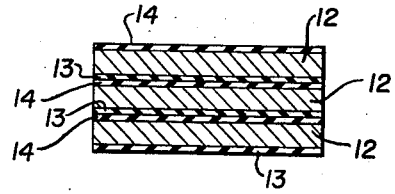
FIGURE 5 is a sectional view taken on the lines 5—5 of FIGURE 2.

Referring now to the drawings, it is to be first understood that the drawings have been exaggerated to show the principle of the invention with the maximum amount of clarity. For this reason, each of the continuous strips shown is to be understood as being made up of a metallic layer coated in the preferred embodiment shown, on both sides with a relatively thin layer of elastomer. A typical section of such continuous strip is shown in FIGURE 6 of the drawings.

Figure 1:
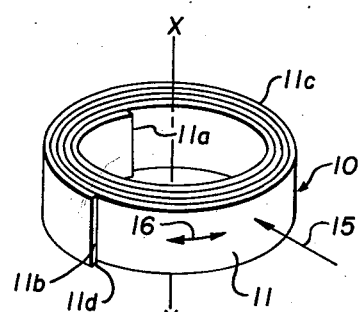
FIGURE 1 is a perspective view of an improved continuous strip type of laminated bearing designed to withstand radially applied loads and yielding to torsionally applied shear forces.

Referring now to FIGURE 1, it will be seen that the bearing 10 illustrated therein includes a strip 11 having ends 11a and 11b and being coiled around an axis of rotation X, X so that the longitudinal edges 11c and 11d are aligned with each other in a common plane as shown in FIGURE 1.

As indicated above, the strip 11 is made up of a flat metallic strip coated on the opposed faces with layers of elastomer. The sectional view of FIGURE 6 would be typical of the cross-section of the strip 11 and, accordingly, would include a metallic layer 12 having elastomer layers 13 and 14 bonded thereto. In this fashion, as the strip 11 is wound, layer 13 will be super-imposed over layer 14, with the layers 13 and 14 serving to define the overall elastomer layer that is disposed between the super-imposed portions of the wound strip 11.

The calculations required for determining the thickness of the layers 12, 13 and 14 are set forth in detail in the above referred to copending application and will not be repeated herein, reference being had to the copending application for this information.

It is believed apparent that the bearing 10 of FIGURE 1 will be enabled to withstand forces applied in the direction of the arrow 15 due to the fact that a force such as this, being appiled radially, merely tends to compress the elastomer layers 13 and 14. However, since these layers have been described as being of such thickness as to be substantially incompressible, it is believed apparent that no such compression will occur.

The bearing 10, however, will be enabled to comply with torsionally applied forces in the direction of the arrow 16, for example, due to the fact that the layers 13 and 14 will yield to shear forces while resisting compression forces.

Figure 2:
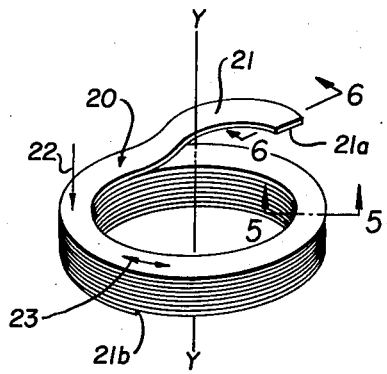
FIGURE 2 is a perspective view of an improved laminated bearing designed to withstand axially applied loads but again yielding to torsionally applied forces.

In the form of the invention shown in FIGURE 2, the bearing 20 is made up of a continuous layer 21 having ends 21a and 21b, with the layer 21 again being made up, as shown in FIGURE 6, of a metallic strip 12 coated on both sides with elastomer layers 13 and 14.

However, in this form of the invention, the faces of the layer 21 are substantially disposed in a plane that is substantially normal to the axis of rotation Y, Y so as to permit the bearing 20 to withstand axially applied loads in the direction of the arrow 22, while yielding to shear forces applied torsionally, for example, in the direction of the arrow 23.

Figure 3:
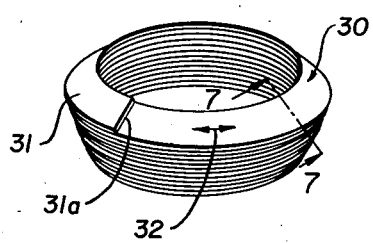
FIGURE 3 is another perspective view of a continuous strip type of laminated bearing designed to withstand a combination of radially applied and axially applied loads.
Figure 7:
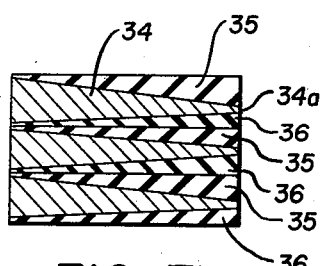
FIGURE 7 is a sectional view taken on the lines 7—7 of FIGURE 3.

In the form of the invention shown in FIGURE 3, the bearing 30 is again made up of a continuous strip 31 having an end 31a, as well as an opposed end (not shown) disposed at the bottom of the coiled bearing 30. The bearing 30 is, however, wound around a form so that the faces thereof are enabled to withstand a combination of axially applied and radially applied loads, with the bearing 30 withstanding such loads while yielding to forces applied in the direction of the arrow 32. If reference will be had to FIGURE 7 of the drawings, it will be noted that the strip 31 is made up of a metallic strip 34 having bonded to the opposed faces thereof elastomer layers 35 and 36, with the metallic strip 34 tapering in cross-section to a minimal thickness dimension adjacent its outer periphery 34a, while the elastomer layers 35 and 36 are complementally formed to fill the space between successive coils of the strip 34. The tapered cross-sectional configuration of the strip 34 is achieved by virtue of the fact that during the rolling of the same into the contour of FIGURE 3, there will be a rearrangement of cross-sectional configuration, with the diameter expanded and simultaneously thinned by virtue of the metal displacement. It is believed apparent that complemental deformation of the elastomer layers coated thereon would occur. This variation in cross-sectional thickness could also be utilized in FIGURE 2 if desired.

Figure 4:
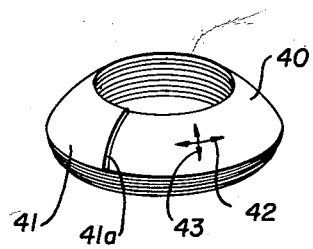
FIGURE 4 is another perspective view showing a spherically surfaced continuous strip laminated bearing intended again to withstand a combination of radially and axially applied loads.

The bearing 40 of FIGURE 4 is again intended to withstand a combination of axially and radially applied loads with shifting in the bearing 40 being permitted in the direction of the arrows 42 and 43 and with the bearing 40 again being made up of a strip 41 having an end surface 41a. In this form of the invention, however, the surface areas of the strip 41 are spherical so as to permit the shifting of the bearing in the direction of the arrow 43, as well as in the direction of arrow 42.

It will be noted that all of the above forms of the invention feature the use of a continuous strip that is wound about an axis of rotation so as to present a bearing made up of alternate layers of metal and elastomer.

It might be thought at first glance that the application of torque forces to the load surfaces of the bearings shown could not actually cause rotation about the axis of rotation because of the fact that the continuous strip of metal would have to be stretched or compressed, depending upon the direction of rotation. However, if the thickness dimensions are considered carefully, it will be noted that the amount of slippage of one layer relatively of the next is so small in comparison to the length of one coil of the strip that the resultant tensile or compressive stress and consequently torque required to stretch or compress the metal strip is, at best, minimal. Moreover, for the configurations of FIGURES 2, 3 and 4, the individual helices will probably not be constrained against attaining a very slight difference in diameter when rotation about the central axis occurs. Under these conditions, essentially no tensile or compressive stress would be placed on the strip due to rotation of torque loads.

Again, it will be seen that in all instances the continuous strip principle has been employed in such a fasion so as not to effect the load bearing properties of the bearing and so as to in no way effect the shear spring properties that are inherent to a bearing of this type.

While a full and complete disclosure of the invention has been set forth in accordance with the dictates of the patent statutes, it is to be understood that the invention is not intended to be so limited.

Accordingly, where the terms "metal" and "elastomer" are used, it is to be understood that any metal or elastomer is contemplated, including rubber for a specific example.

Accordingly, modifications of the invention may be resorted to without departing from the spirit hereof or the scope of the appended claims.

This applicattion is a continuation-in-part of applicant's copending application, Serial No. 504,324, filed April 24, 1955, and now U.S. Patent 2,900,182.

What is claimed is:
1. A laminated bearing of the character described, comprising; a continuous elongated metallic strip having opposed faces and being wound around an axis of rotation to define a continuous metallic coil having aligned edges; first and second elongated elastomer strips each having opposed faces and each having one face thereof bonded to one face of said metallic coil in aligned relationship with the edges thereof, whereby said first and second elastomer strips are continuously disposed in coiled condition between the adjacent coils of said metallic strip being substantially incompressible to forces applied normally to said faces thereof but yielding to forces applied normally to the thickness dimension of said strips, whereby the adjacent face surfaces of said metallic strip may shift relatively of each other while the spacing therebetween is maintained substantially constant by said elastomer strip.

2. A laminated bearing of the character described, comprising; alternate layers of metal and elastomer bonded to each other in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; at least one said layer varying in transverse cross-sectional thickness.

3. A laminated bearing of the character described, comprising;
   (1) a continuous elongated metallic strip
      a. having opposed faces that have longitudinal and transverse dimensions and
      b. being wound around an axis of rotation to define a continuous metallic coil having aligned edges defining the transverse width thereof, and
   (2) a continuous elongate elastomer strip
      a. having opposed faces that have longitudinal and transverse dimensions substantially equal to the longitudinal and transverse dimensions of said metallic strip,
      b. being continuously disposed in aligned coiled condition between adjacent coils of said metallic strip, and
      c. being substantially incompressible to forces applied normally to said faces thereof but yielding to forces applied in parallel with said faces, whereby adjacent face surfaces of said coil may shift relatively of each other while the spacing therebetween is maintained constant by said elastomer strip.

4. The device of claim 3 further characterized by the fact that said faces of said strips are substantially disposed in a plane that is substantially normal to said axis of rotation.

5. The device of claim 3 further characterized by the fact that said faces of said strips are substantially disposed in parallelism with said axis of rotation.

6. The device of claim 3 further characterized by the fact that said faces of said strips are substantially disposed at an acute angle with respect to said axis of rotation.

7. The device of claim 3 further characterized by the fact that said elastomer strip varies in transverse cross-sectional thickness.

8. The device of claim 3 further characterized by the fact that said metallic strip varies in transverse cross-section thickness.

References Cited in the file of this patent
UNITED STATES PATENTS

| | | |
|---|---|---|
| 2,127,219 | Hirshfeld | Aug. 16, 1938 |
| 2,532,327 | Parks | Dec. 5, 1950 |
| 2,667,389 | Smith | Jan. 26, 1954 |
| 2,784,998 | Blackwood | Mar. 12, 1957 |
| 2,786,670 | Hammond | Mar. 26, 1957 |
| 2,900,182 | Hinks | Aug. 18, 1959 |